Oct. 31, 1950          A. MAGNANI          2,528,155
MANUFACTURE OF SOCKET-PIPES OF ASBESTOS-CEMENT
Filed June 11, 1948          2 Sheets—Sheet 1
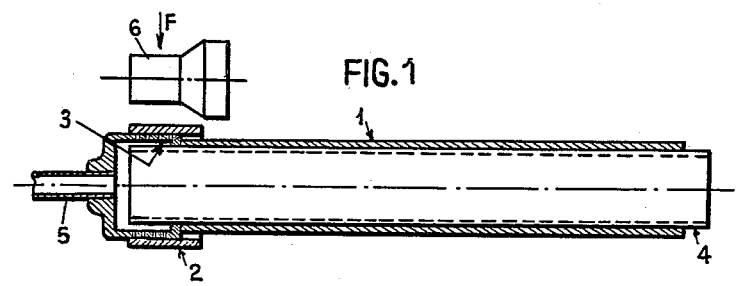
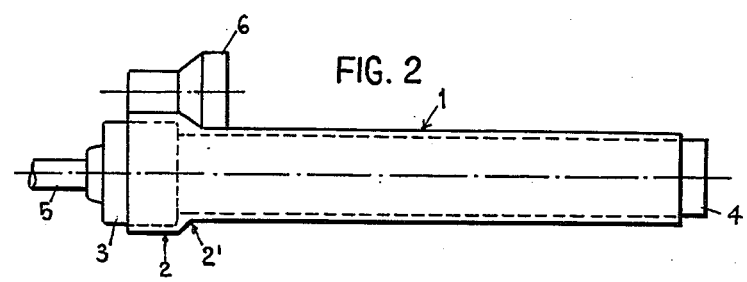
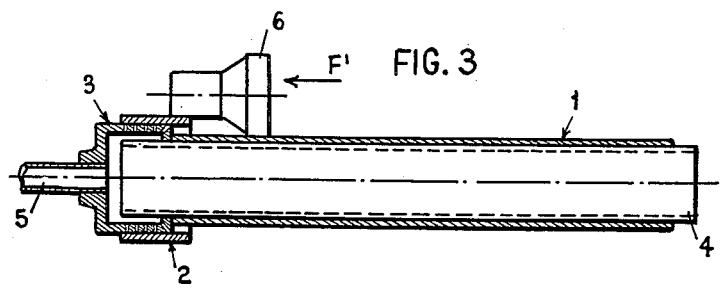
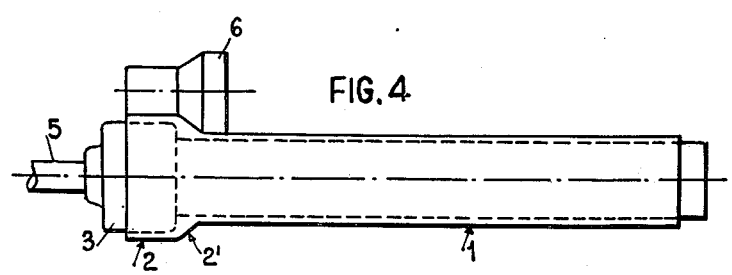
Inventor
Alessandro Magnani
by Sommers & Young
Attorneys Oct. 31, 1950            A. MAGNANI            2,528,155
MANUFACTURE OF SOCKET-PIPES OF ASBESTOS-CEMENT
Filed June 11, 1948                        2 Sheets-Sheet 2
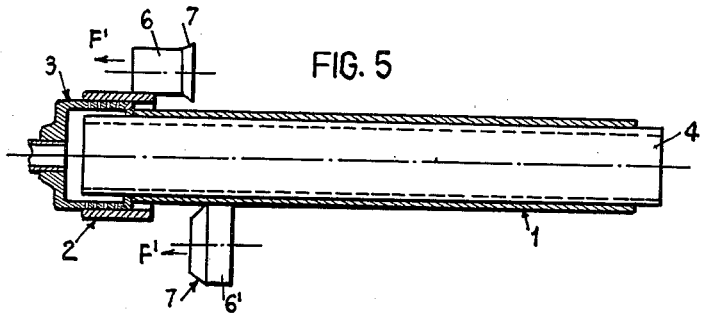
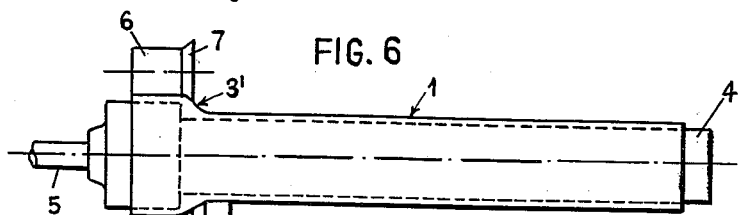
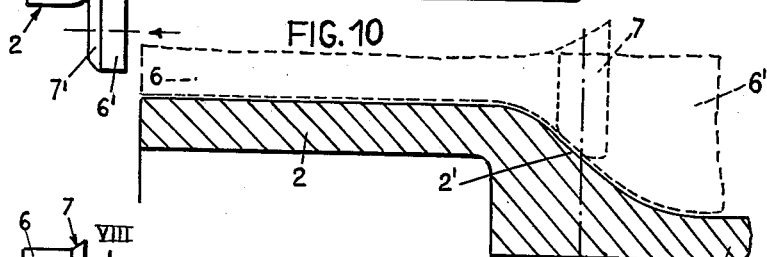
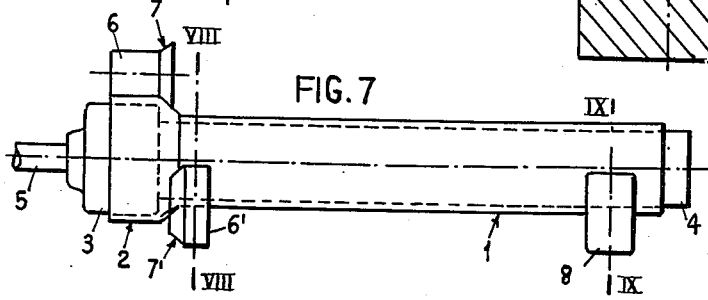
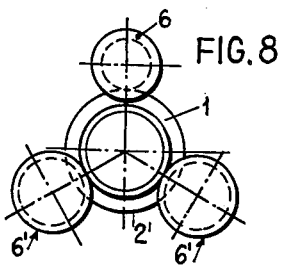
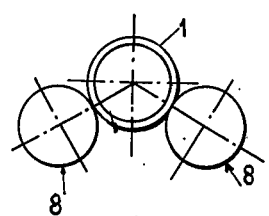
Inventor
Alessandro Magnani
by Sommers & Young
Attorneys Patented Oct. 31, 1950

2,528,155

UNITED STATES PATENT OFFICE 2,528,155

MANUFACTURE OF SOCKET PIPES OF ASBESTOS-CEMENT

Alessandro Magnani, Broni, Italy

Application June 11, 1948, Serial No. 32,394
In Italy July 23, 1947

9 Claims. (Cl. 154—42)

1

Processes for the manufacture of pipes of cement and asbestos or other fibrous substances are known.

One of these consists in agglomerating the fibrous material on a suitable support having a permeable surface through which can be generated an under-pressure which serves to eliminate excess water. Successively the article thus formed is subjected to rolling by means of rollers, conveniently shaped as the under-pressure is maintained therein. In this way close packing and accurate shaping of the material are obtained. This process permits the manufacture of socket-pipes which however do not possess very satisfactory strength.

Another known system for the manufacture of pipes consists in utilizing the machine for making card-board plates in which the material is intermediately shaped to tube form (or other machines similar to those employed in the manufacture of paper), by means of which a thin layer of mix is wound continuously on a metal support. Pipes produced by this process are of an excellent strength, but can be produced only in cylindrical shape, which constitutes a serious drawback in joining them together.

A process is also known for overcoming this inconvenience, according to which a piece of pipe produced by this same system and having a larger diameter, is fitted to an end of the pipe and welded thereto, giving to it at the same time a socket-shape, by means of rollers which exert compression from without on the region of the joint. This pressure should be relatively low in order to avoid removing the pipe from its support, and for this reason the finished pipe is in the region of the joint less solidly packed and consequently of greater porosity and less strength.

An object of this invention is to provide a method and an apparatus for the manufacture of socket-pipes of asbestos-cement, utilizing the advantages of the known systems and avoiding at the same time their drawbacks.

A further object of this invention is to provide a method of manufacturing socket-pipes of asbestos-cement consisting in separately forming two cylindrical blanks, equalling in diameter the pipe body and socket, respectively, in overlapping by one end of the socket blank one end of the pipe blank as said blanks still are in a green condition and in upsetting against each other the overlapping ends of said blanks by pressure from the outside and suction from the inside.

A further object of this invention is to provide an apparatus for carrying out the above mentioned method, comprising a mandrel adapted to receive a cylindrical pipe blank still in a green condition, and a further bored mandrel adapted to receive a cylindrical socket blank still in a green condition; the bored mandrel is formed with an internal annular flange at one end, equalling in radial height the thickness of the pipe being formed and said flanged end may be fitted on one end of said first-mentioned mandrel in such manner that one end of the socket blank may overlap the adjacent end of the pipe blank. One or a plurality of shaping tools having cylindrical portions adapted to cooperate with said mandrels and a shaped portion adapted to form the connection between the socket and pipe, may be brought to their operative position to weld together by upsetting the overlapping blank portions. The welding and homogenizing of the two overlapping layers of asbestos-cement are improved by the suction acting between the overlapped layers through the bored mandrel.

The accompanying drawings, as diagrammatic examples, illustrate some embodiments of the invention:

Figures 1 and 2 illustrate the process for the embodiment of which rollers of one and the same type are used, which are displaced for the upsetting in a direction normal to the axis of the pipe.

Figures 3 and 4 refer to a modified construction in which a single type of roller is used, and the rollers perform an axial movement parallel to the axis of the pipe.

Figures 5 and 6 refer to another construction in which the upsetting is exerted by means of two different types of rollers, one of which includes one region of the socket-joint of the pipe, while the other includes the remaining region; in this sort of construction then the rollers perform an axial movement parallel to the movement of the pipe in order to produce the upsetting.

Figures 7, 8 and 9 refer to the same device illustrated in Figures 5, 6 and indicate the arrangement of the rollers, upsetting and supporting the pipe during the joining operation of the socket; Figures 8 and 9 are cross-sections according to lines VIII—VIII and IX—IX respectively of Figure 7; and lastly Figure 10, on a larger scale and in finer detail, illustrates the two complementary pressure rollers matching the shape of the socket.

With reference to the drawings:

Numerals 1 and 2 indicate the two pipe sections of different diameters, manufactured separately, for example by the machine for making round card-board plates in which the material is intermediately shaped to tube form, intended to be welded together to form the socket, according to the process of the invention.

To this end, as pipe blank 1 is mounted on the spindle 4, the blank 2, intended to form the socket, is mounted on a metal sleeve 3 having a permeable surface, through which suction is induced in the area where the section is to be joined to the pipe blank 1, as is clearly shown in Figures 1, 3 and 5.

The sleeve 3 is further formed with an internal annular flange, equalling in height the thickness of the pipe blank 1, said flange being brought for manufacturing the pipe against the end of the pipe blank.

For this purpose the metal sleeve 3 provided with a suction-pipe 5.

The two blanks 1 and 2, manufactured in the aforesaid manner and while still wet, that is before the cement has begun to set, are subjected, in the welding area, to the simultaneous action of the upsetting-pressure from outside and the suction from within, to induce the removal of excess moisture and to keep the pipe against its own support in the said area.

In the various constructions shown in the drawings, the upsetting of the region of the joint between the socket and the pipe is effected with conveniently shaped rollers rotating about their own axis and which are held against the pipe to be manufactured which is also rotating about its own axis.

Figures 1, 3, 5 represent the initial stages of the socket welding operation according to the various constructions, while Figures 2, 4, 6, 7, 10 represent the final position of the upsetting-rollers with respect to the pipe on the completion of the operation.

In the construction of Figures 1 and 2, the upsetting-pressure is exerted by a single type of rollers 6, a single one of which is shown in the drawing, the rollers are moved forward radially, as shown by the arrow F, towards the blanks 1 and 2, arriving at the position in Fig. 2.

Rollers 6 are made up of two cylindrical portions rolling on the external surface of the blanks 1 and 2, and an intermediate conical portion merging into the former and matching the external shape of the socket; said shaped portion serving to produce the upsetting in the region of the joint between the socket and the pipe.

The blank 2 is fitted on sleeve 3 as clearly shown in Figure 1, so as to project from the edge of sleeve 3. Moreover said edge constitutes the abutment for the pipe 1 and, during the upsetting, determines the form of the internal surface at the bottom of the socket, while the external surface is determined by the rollers.

In the construction of Figures 3 to 9 the rollers are longitudinally displaced along their axis parallel to the axis of the pipe according to arrow F'.

In the construction of Figures 3 and 4 there is a single type of roller, corresponding to that of Figures 1 and 2; on the other hand in construction of Figures 5 to 9, there are two types of rollers. Rollers 6 comprise the cylindrical portion rolling on the external surface of the blank 2 of the socket, and a conical portion 7, merging into the former, intended to form, in the upsetting, one part of the external shape of the socket. Rollers 6' comprise a cylindrical portion rolling on the pipe blank 1 and a conical portion 7' merging into the former, and intended to form the other part of the shape of the socket.

Figure 10 represents in detail the forming of the shape of the socket by the use of the two aforesaid types of rollers the shape being drawn superposed on the same plane.

Figures 7 to 9 represent the device of the type shown in Figures 5 and 6 and the supporting means for the pipe using the rollers 8.

In operation the rollers, the spindle and the sleeve having a permeable surface are all put in rotation.

It will be understood that in the device for carrying out the process the form and constructional details are widely variable from the diagrams shown in the drawings within the scope of the invention.

What I claim is:

1. Method of manufacturing asbestos cement pipes having a socket shaped end, comprising separately forming two cylindrical blanks equalling in diameter the pipe body and socket, respectively, in overlapping by one end of said socket blank one end of said pipe blank, while said blanks still are in a green condition and in pressing together the overlapping portions of said two blanks by suction from the inside and compression from the outside.

2. Method of manufacturing asbestos cement pipes having a socket shaped end, comprising separately forming a pipe blank and a socket blank, in fitting said pipe blank on a mandrel, in partly fitting said socket blank on a bored mandrel equalling in outer diameter the inner socket diameter, in fitting said bored mandrel on one end of said first-mentioned mandrel in order to overlap the end of the pipe blank by the projecting end of said socket blank and, before the cement sets, in subjecting the overlapped portions of said blanks to rolling from outside and suction from the inside through the bored mandrel.

3. Method of manufacturing asbestos cement pipes having a socket-shaped end, comprising separately forming a pipe blank and a socket blank, in fitting said pipe blank on a mandrel, in partly fitting said socket blank on a bored mandrel equalling in outer diameter the inner diameter of the socket in the finished pipe, in fitting said bored mandrel on one end of said first-mentioned mandrel in order to overlap the end of said pipe blank by the projecting end of the socket blank and in subjecting before the cement sets the overlapped portions and portions adjacent thereto of the two blanks to rolling from the outside by means of a plurality of shaped rollers and to suction from the inside of the bored mandrel.

4. Apparatus for the manufacture of asbestos cement pipes having a socket-shaped end, comprising a mandrel adapted to receive a pipe blank as it still is in a green condition, a bored mandrel adapted to receive a socket blank as it still is in a green condition, said second-mentioned mandrel equalling in outer diameter the inner diameter of said socket blank and having an internal annular flange at one end equalling in radial height the thickness of the pipe being formed, said flanged end being adapted to be fitted on one end of said first-mentioned mandrel, and at least one shaping roller having a cylindrical portion adapted to cooperate with said bored mandrel, a cylindrical portion adapted to cooperate with said first-mentioned mandrel and an intermediate shaped portion merging into said first-mentioned cylindrical portions and adapted to form the connection of the pipe being formed.

5. Apparatus as claimed in claim 4, and means for bringing the roller to its operative position by a movement directed radially with respect to the pipe being formed.

6. Apparatus as claimed in claim 4, and means for bringing the shaping roller to its operative position by a movement directed axially towards the socket end of the pipe being formed.

7. Apparatus for the manufacture of asbestos cement pipes having a socket-shaped end, comprising a mandrel adapted to receive a pipe blank as it still is in a green condition, a bored mandrel adapted to receive a socket blank as it still is in a green condition, said second mentioned mandrel equalling in outer diameter the inner diameter or said socket blank and having an internal annular flange at one end equalling in radial height the thickness of the pipe being formed, said flanged end being adapted to be fitted on one end of said first-mentioned mandrel, a plurality of shaping rollers having a cylindrical portion adapted to cooperate with said first-mentioned mandrel and a shaped portion adapted to form a merging portion on the pipe being formed and a plurality of shaping rollers having a cylindrical portion adapted to cooperate with the bored mandrel and a shaped portion adapted to form the other merging portion on the pipe being manufactured.

8. Apparatus as claimed in claim 7, in which the shaping rollers are brought to their operative position by a relative axial displacement of said rollers with respect to the mandrels.

9. Apparatus as claimed in claim 7, in which the shaping rollers also serve in part for supporting the pipe as it is manufactured.

ALESSANDRO MAGNANI.

REFERENCES CITED

The following references are of record in the file of this patent:

UNITED STATES PATENTS

| Number | Name | Date |
|---|---|---|
| 2,177,643 | Ferla | Oct. 31, 1939 |
| 2,369,608 | Salvaneschi | Feb. 13, 1945 |
| 2,374,087 | Ferla | Apr. 17, 1945 |
| 2,383,582 | Barbehenn | Aug. 28, 1945 |